June 15, 1937.   F. S. BARKS   2,083,591
LUBRICATING APPARATUS
Filed Nov. 29, 1935   3 Sheets-Sheet 1

Frank S. Barks,
Inventor
Delos G. Haynes,
Attorney.

June 15, 1937.   F. S. BARKS   2,083,591
LUBRICATING APPARATUS
Filed Nov. 29, 1935   3 Sheets-Sheet 2

Frank S. Barks,
Inventor.
Delos G. Haynes,
Attorney

Patented June 15, 1937

2,083,591

UNITED STATES PATENT OFFICE 2,083,591

LUBRICATING APPARATUS

Frank S. Barks, St. Louis, Mo., assignor to Lincoln Engineering Company, St. Louis, Mo., a corporation of Missouri Application November 29, 1935, Serial No. 52,141

10 Claims. (Cl. 284—17)

This invention relates to lubricating apparatus, and with regard to certain more specific features, to coupling means for use between lubricant conduit sections.

Among the several objects of the invention may be noted the provision of a lubricant receiving fitting and a coupling member therefor in which, upon disconnection of the coupler from the fitting, there is effected an automatic and positive closure of the fitting, and one in which the ordinary disadvantage is overcome of high resistance of flow due to the positive closure feature; the provision of a coupler of the class described in which an easy coupling may be effected; the provision of apparatus of this class which may be used for lubricant delivery under pressure through less strong hose; and the provision of apparatus of this class which is simple of construction and economical to manufacture. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which are illustrated several of various possible embodiments of the invention, Fig. 1 is a cross section of a lubricant-receiving element or fitting;

Similar reference characters indicate corresponding parts throughout the several views of the drawings.

Figure 1:
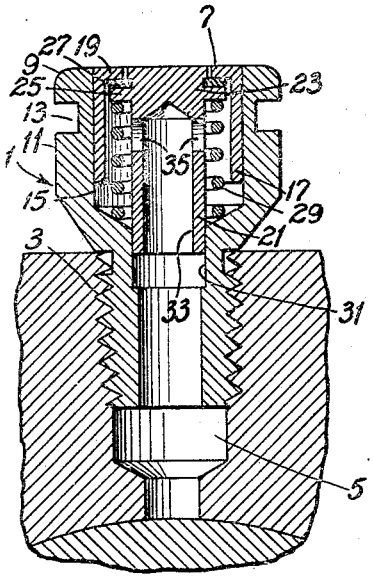

Referring now more particularly to Fig. 1, there is shown at numeral 1 a fitting which is provided with a threaded shank 3 for screwing the same into a lubricant-receiving opening 5.

The fitting 1 has a flat top 7 which is rounded at the periphery 9. The cylindric side 11 is provided with a peripheral groove 13. The fitting is counterbored as shown at 15 to accommodate with a pressed fit, a bushing 17, the latter having a turned-in, top flange 19.

Within the bushing 17 is a hollow valve member 21 having a head 23 flanged at 25 to form a support for a sealing gasket 27, the latter normally seating against the underside of the inwardly-turned flange 19. The flange 25 also serves as an abutment for a closing spring 29 which reacts downwardly against the bottom of the counterbore 15. The counterbore 15 is connected downwardly to a smaller counterbore 31 which slidably receives the lower end of the open, hollow valve 21. The hollow body portion 33 of the valve 21 communicates with the counterbore 15 by means of an opening 35.

From the above, it will be seen that the spring 29 normally forces the hollow valve 21 so that the washer or sealing gasket 27 seats under the flange 19. In this condition, the top of the valve 21 is flush with the top of the fitting 1. It will also be seen that if a suitable amount of pressure be placed upon the valve 21, that the same may be depressed to open the seat at the washer 27, thus to permit ingress of lubricant or the like around the flange 25 and into the opening 35, and thence through the hollow portion 33 to the lubricant-receiving conduit 5.

Figure 2:
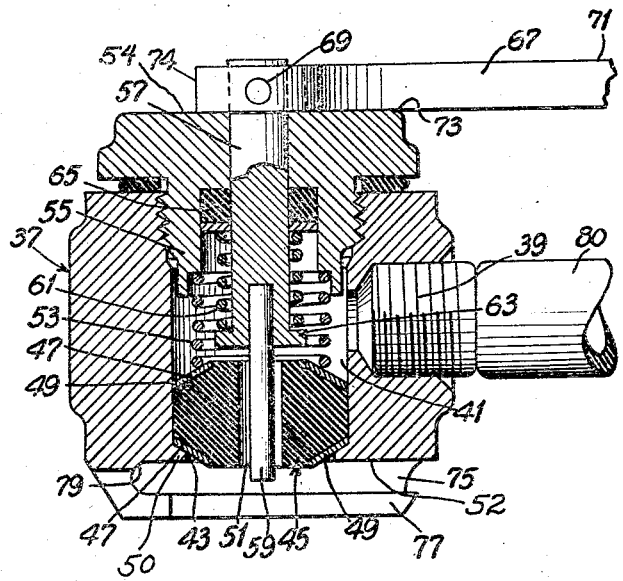
Fig. 2 is a cross section of a coupler element.
Figure 3:
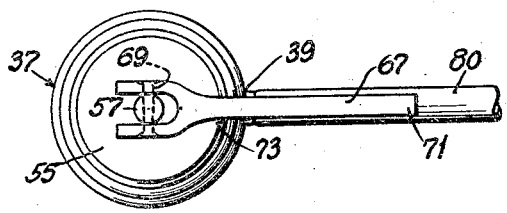
Fig. 3 is a reduced top plan view of Fig. 2.

The coupler, shown in its normal, disconnected position in Fig. 2, comprises a body 37 having an inlet 39 leading to a cylinder 41, at the bottom of which is a shouldered opening 43. A movable packing member 45 seats on the shoulder of opening 43. The packing 45 is beveled as shown at numerals 47 and has conic enclosing cups 49 around the bevels about the lower and upper faces. Centrally, the packing 45 is provided with an exit opening 51. The packing 45 is normally held down against the shoulder 50 (Fig. 2) of opening 43 by means of a spring 53 reacting against an upper head 55, the latter enclosing the cylinder 41.

Mounted in the head 55 is a stem 57 which at its lower end carries a finger 59. A spring 61 acting on a head 63 of the stem 57 and reacting against a packing washer 65 in the head 55, serves normally to hold the stem in a position such that the finger 59 is forced downwardly to extend from the opening 51 and below the lower surface 52 (Fig. 2) of the coupling. A limiting stop is effected by the action against surface 54 of a control handle 67 pinned to the stem at 69.

By depressing the handle 67 by pressure at 71, a fulcrum is effected at 73 to raise the pin 57, and consequently the finger 59. Otherwise, the finger 59 is down. Or, the handle 67 may be rotated counterclockwise (Fig. 7) so that the flat end 74 acts as a cam to raise the stem 57 and hold it in position with the finger 59 retracted.

Figure 5:
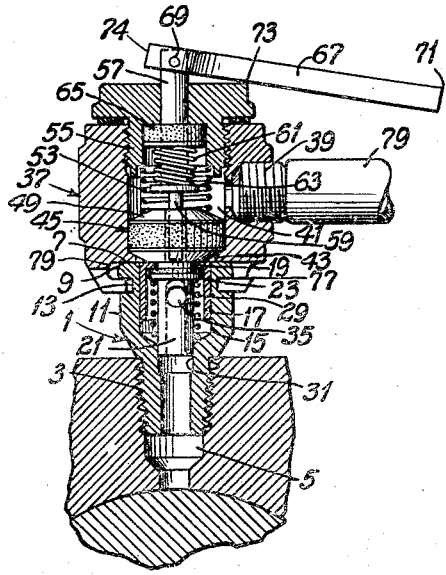
Fig. 5 is a view showing the elements of Figs. 1 and 2 coupled together, but prior to opening of the valve in the lubricant-receiving element.
Figure 4:
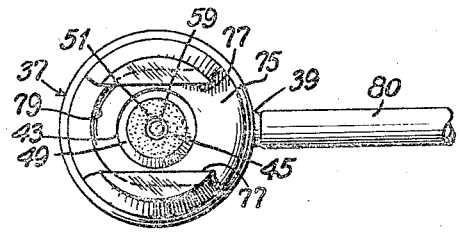
Fig. 4 is a reduced bottom plan view of Fig. 2.
Figure 6:
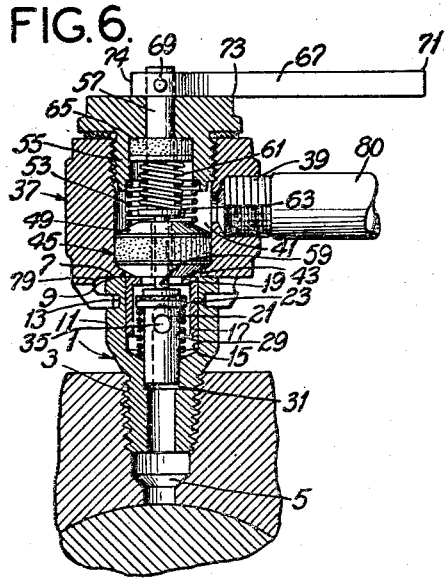
Fig. 6 is a view similar to Fig. 5 showing the valve open.
Figure 7:
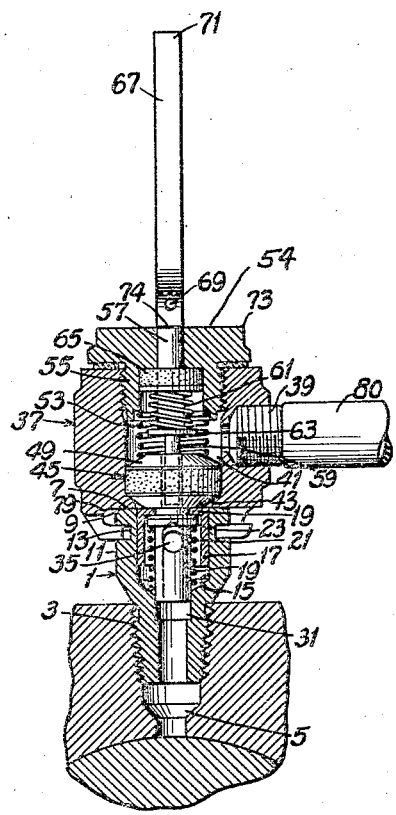
Fig. 7 is a view similar to Fig. 5 showing an arrangement of parts for permanently actuating a control.
Figure 8:
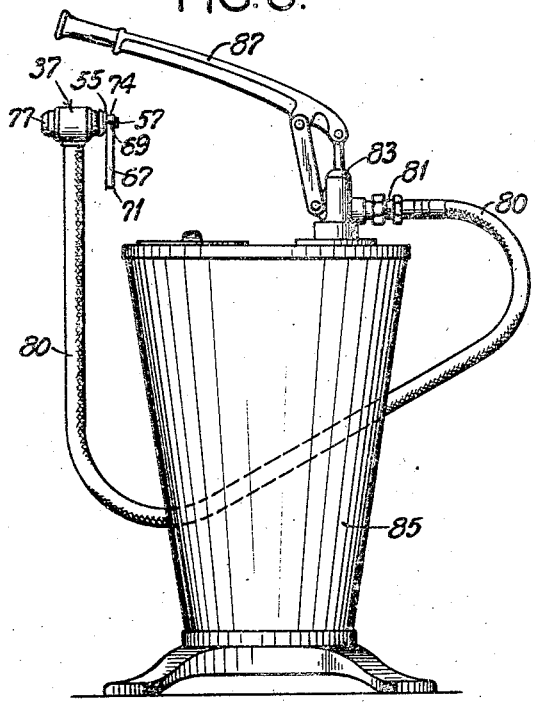
Fig. 8 shows the coupler applied to the end of a lubricant hose which is attached to a lubricant pump for supplying the coupler; and, Fig. 9 is a view similar to Fig. 6, but enlarged, showing an alternative form of the invention.

The lower part of the body 37 is provided with a guide 75 for receiving the top of the fitting and inwardly directed shelf-portions 77 for sliding into the peripheral groove 13. A stop 79 prevents the fitting from passing out of the end of the guide 75. Thus a simple pull of the coupling serves to align and attach the same to the fitting, provided the pin 59 has been retracted as shown in Fig. 5 or 7.

The coupler is attached to the end of a pressure hose 80 which communicates with the outlet 81 of a grease pump 83 which sucks lubricant from a supply compartment 85 and delivers it to the coupler 37 by way of said hose 80. The pump 83 is manually actuated by means of a handle 87, but it is to be understood that this pump may be of the automatic type.

In operation, the portion of the hose 80 adjacent the coupler 37 is grasped with the fingers, while the palm of the hand is placed at 71 on the handle 67. The handle is depressed, thereby raising the pin 59 (Fig. 5). Then the guide 75 is applied over the head of the fitting, the shelves 77 sliding into the peripheral recess 13. This action causes a contact between the flat top 7 of the fitting and the metal-sheathed bevel of the lower end of the packing 45 in the coupler 37, the latter being thus raised. The spring 53 assures initial seating of the unsheathed end of the packing 45 against the upper surface of the fitting.

Next, the handle 71 is released, whereupon the spring 61 forces down the pin 57 and hence the finger 59 is forced against the upper surface of the hollow body 21, the latter being forced down to open a passage between the gasket 27 and the shoulder 19. The operator may then let go of handle 67 and operate the pump handle 87. Inasmuch as the stronger spring 61 holds open the valve in the fitting against the weaker spring 29, no initial lubricant pressure needs to be engendered to open the valve in the fitting, that is, no back pressure due to this cause needs to be overcome. In older forms of this class of device, some four hundred pounds per square inch of initial pressure is required to send grease through the fitting. This involves a substantial amount of power, and whether the pump is of the hand or power variety, it is undesirable.

Even though the spring 61 be or become insufficiently strong to depress the spring 29 and thence open the valve 21 in the fitting 1, nevertheless pressure developed by the spring 61 will be carried by means of the stem 59 to the valve 21, and thereby reduce, by the amount of the force in the spring 61, the amount of pressure required on the lubricant for opening the valve 21. This means that any stiffness of spring 61 will result in a reduction in the amount of valve-opening pressure required.

The elimination of the back pressure also means that the delivery hose from the pump to the coupler need not withstand a total pressure which is the sum of the pressure required for overcoming resistance in the fitting per se plus the pressure due to conditions beyond the fitting; but only the pressure due to conditions beyond the fitting. Thus, weaker and less expensive hose may be used and one which is much lighter and more flexible. The operator may want to hold up the pin 59 by setting the handle 67 vertically so that he may thereafter make the connection without simultaneously touching the handle. This is a provision of convenience.

It is to be understood that the handle may be operated to perform the functions herein described by being turned laterally, or otherwise in connection with a suitable cam.

Incoming pressure serves always to force the packing 45 down to a seat on the top of the fitting, thus augmenting the action of spring 53.

By means of this invention the fitting may be designed with an amply strong spring for positively seating the valve 21 and thus effectively keeping out dirt, that is, there is a positive sealing closure. The more positive the closing, the higher the back pressure engendered, but the coupling provided herein being provided with means for opening the valve 21 and holding it open eliminates all valve back pressure even with a strong spring 29. The spring 61 must be stronger than spring 29 in order to effect a complete opening, but any strength of the spring 61 will be effective to press against the valve 21 and to reduce proportionately the pressure that the pump 83 would otherwise be required to develop in order to open the valve.

Figure 9:
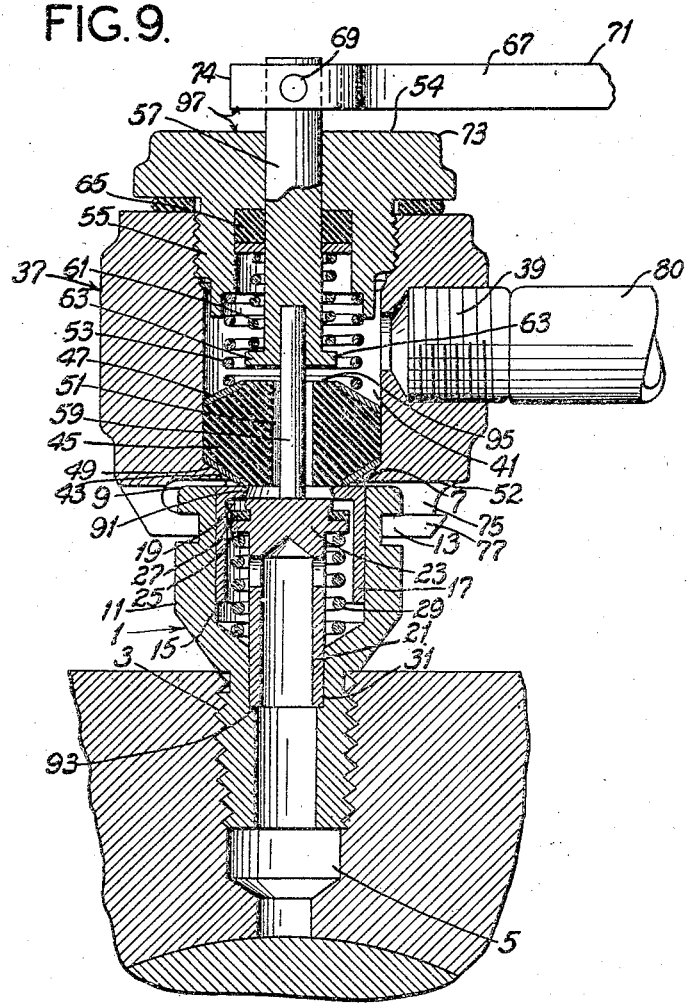

In Fig. 9 is shown another form of the invention in which like numerals designate like parts. In this form of the invention, there is shown at numeral 91 an inwardly flaring taper on the inlet to the fitting whereby an ample flow area is assured when the valve 23 is open. Furthermore, a stop 93 is arranged to limit the downward travel of the valve 23 for purposes which will be shown.

The unseating pin or finger 59 in the coupler is again formed as an extension from the stem 57 but the flange 63 on this stem is arranged to seat on the upper surface 95 of the sealing member 45 when the coupler is disconnected from the fitting. This is arranged for by pinning the handle 67 at a higher location on the stem 57. The space provided at 97 is enough that when the coupler is disconnected, the spring 61 may force the flange 63 to a seat on the sealing member 45. Thus, there is effected an automatic closure on the coupler outlet upon disconnection from the fitting.

Prior to coupling the coupler of Fig. 9 to the fitting of Fig. 9, the handle 67 lies a little above the upper surface 54. By depressing the handle 67 and fulcruming it on the edge of the surface 54, or turning the handle 67 upwardly as already described herein, the stem 57 is lifted to raise the flange 63 from its seat on the sealing member 45. The coupling is then made and the handle 67 released. The spring 61 pushes down the stem 57 and pin 59, whereby the latter engages the valve 23 to push the same downwardly. The downward push is limited by contact of the valve with the shoulder 93, so that the flange 63 is prevented from re-seating on the sealing member 45. Thus, when the handle 67 is released, the valve 23 is maintained in an open position, as well as the flange 63, and upon pumping, lubricant may be forced through the connection. To disconnect, the handle is again depressed, or raised, which retracts the pin 59 to permit of clearing of the coupler from the fitting.

The advantage of having the shoulder 63 seat on the sealing member or packing 45 when the coupler is disconnected is to prevent inadvertent exudation of lubricant when the coupler is disconnected. For instance, someone might inadvertently operate the pump handle 87 while the coupler is disconnected and thus spill grease about. This automatically closing valve prevents this.

It will be noted that the packing means 45 is exposed to the pressure in the coupler, whereby the bias thereon by spring 53 is augmented.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

I claim:

1. Lubricating apparatus comprising a hollow fitting having an inlet, a valve in said fitting normally biased outwardly to close said inlet, a coupler adapted to attachably cooperate with said fitting and having a passage therethrough, a movable means associated with said coupler which means is formed and normally biased when the coupler is attached to the fitting to open said valve in the fitting, and means for retracting said movable means against its bias independently of the operation of applying the coupler to the fitting.

2. Lubricating apparatus comprising a hollow fitting having an inlet, a valve in said fitting normally biased outwardly against said inlet to close the same, a coupler adapted to attachably cooperate with said fitting and having a passage therethrough, packing means normally biased to form a seal with the fitting when the coupler is attached, a movable means associated with said coupler which means is formed and normally biased when the coupler is attached to the fitting to open said valve in the fitting, and means for temporarily retracting said movable means against its bias independently of the operation of applying the coupler to the fitting.

3. Lubricating apparatus comprising a hollow fitting having an inlet, a valve in said fitting normally biased outwardly against said inlet to close the same, a coupler adapted to attachably cooperate with said fitting and having a passage therethrough, packing means normally spring-biased to form a seal with the fitting when the coupler is attached, a spring for said spring bias, a movable means in said coupler which means is formed and normally biased when the coupler is attached to the fitting to open said valve in the fitting, and means for temporarily retracting said movable means against its bias independently of the operation of applying the coupler to the fitting, said packing means being also exposed to pressure in the coupler to augment its spring bias.

4. Lubricating apparatus comprising a hollow fitting having an inlet, a valve in said fitting normally biased outwardly to close said inlet, a coupler adapted to attachably cooperate with said fitting and having a passage therethrough, a movable means associated with said coupler which means is formed and normally biased when the coupler is attached to the fitting to open said valve in the fitting, means for temporarily retracting said movable means against its bias independently of the operation of applying the coupler to the fitting, and means for permanently setting said retracting means to a retracted position.

5. Lubricating apparatus comprising a hollow fitting having an inlet, a valve in said fitting normally biased outwardly against said inlet to close the same, a coupler adapted to attachably cooperate with said fitting and having a passage therethrough, a movable pin associated with said coupler and normally biased to contact said valve when the coupler is attached to the fitting thus to open said valve in the fitting, and manually operable means for temporarily retracting said movable pin against its bias and independently of the operation of applying the coupler to the fitting, said manually operable means being adapted to hold said movable pin in retracted position independently of the operator until he effects a manual release of said manually operable means.

6. Lubricating apparatus comprising a hollow fitting having an inlet, a valve therein normally biased to closing position against said inlet, a coupler adapted by a predetermined movement to be attached to said fitting, said coupler having an inlet and an outlet, the outlet being adjacent the fitting inlet upon attachment, a finger extending from the coupler at right angles to the plane of movement in making an attachment, means normally biasing said finger to its extended position, and means for retracting said finger temporarily while executing movement of attachment, said last-named means being operable independently of the operation of applying the coupler to the fitting, the finger thereafter being manually releasable to be automatically biased to protrude from the coupling to open said valve in said fitting.

7. Lubricating apparatus comprising a hollow fitting having an upward inlet, a valve therein normally upwardly biased to closing position against said inlet, a coupler adapted to be attached to said fitting by a movement laterally of the axis of the fitting, said coupler having a side inlet and a bottom outlet, the outlet being adjacent the fitting inlet upon attachment, a hose attached to the inlet, a finger extending from the coupler outlet normally to the plane of movement in making an attachment, means normally biasing said finger to its extended position, and an independently and manually operable handle extending along said hose for retracting said finger temporarily while making an attachment, the finger thereafter automatically being biased to open said valve in said fitting.

8. Lubricating apparatus comprising a hollow fitting having an upper inlet, a valve therein normally biased upwardly to closing position against said inlet, a coupler adapted by a lateral movement to be attached to said fitting, said coupler having an inlet and outlet, the outlet being adjacent the fitting inlet upon attachment, a member extending through the coupler normally to the lateral movement in making an attachment, a spring normally biasing said member to an extended position, a handle pinned to said member for movement against the coupling to retract said member temporarily independently of the movement of making an attachment, a seal in the coupler, and a spring for initially biasing the seal against said fitting, the seal being exposed to pressure in the coupler to effect seating of the seal under pressure.

9. Lubricating apparatus comprising a hollow fitting having an inlet, a valve in said fitting normally biased outwardly against said inlet to close the same, a coupler adapted to attachably cooperate with said fitting and having a passage therethrough, packing means normally spring-biased to form a seal with the fitting when the coupler is attached, a spring for said spring bias, a movable means in said coupler and normally biased when the coupler is attached to the fitting to open said valve in the fitting, means for temporarily retracting said movable means against its bias while the coupler is being applied to the fitting, said packing means being also exposed to pressure in the coupler to augment its spring bias, a valve portion associated with said movable means in the coupler adapted to close to a seat on said packing when said movable means follows its bias, and means in the fitting limiting movement of the valve therein to a degree which will prevent said valve element in the coupler from seating on said packing when the coupler is attached to the fitting.

10. Lubricating apparatus comprising a hollow fitting having an inlet, a valve therein normally biased to closing position against said inlet, a coupler adapted by a predetermined movement to be attached to said fitting, said coupler having an inlet and an outlet, the outlet being adjacent the fitting inlet upon attachment, a finger extending from the coupler at right angles to the plane of movement in making an attachment, means normally biasing said finger to its extended position, manually operable means for retracting said finger temporarily and independently of the movement of attachment, the finger thereafter upon manual release automatically being biased to protrude from the coupling to open said valve in said fitting, means in the fitting limiting valve movement when open to a degree preventing complete biasing of said finger to its fully extended position, a packing in the coupling cooperating with the fitting when the coupling is attached, and valve means associated with said finger, said last-named valve cooperating with said packing when the coupler is detached and the pin is in its fully extended position, and being unseated from said packing when in the partially extended position of the finger such as permitted by the limited movement of said valve located in the fitting.

FRANK S. BARKS.